United States Patent
Ozcaglar et al.

(10) Patent No.: US 10,769,136 B2
(45) Date of Patent: Sep. 8, 2020

(54) GENERALIZED LINEAR MIXED MODELS FOR IMPROVING SEARCH

(71) Applicant: Microsoft Technology Licensing, LLC, Redmond, WA (US)

(72) Inventors: Cagri Ozcaglar, Sunnyvale, CA (US); Xianren Wu, San Jose, CA (US); Jaewon Yang, Sunnyvale, CA (US); Abhishek Gupta, San Francisco, CA (US); Anish Ramdas Nair, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 15/826,279

(22) Filed: Nov. 29, 2017

(65) Prior Publication Data

US 2019/0163780 A1    May 30, 2019

(51) Int. Cl.
    *G06F 16/242*    (2019.01)
    *G06F 16/25*     (2019.01)
    *G06F 16/248*    (2019.01)
    *G06F 16/9535*   (2019.01)
    (Continued)

(52) U.S. Cl.
    CPC ........ *G06F 16/2423* (2019.01); *G06F 16/248* (2019.01); *G06F 16/25* (2019.01); *G06F 16/9535* (2019.01); *G06F 16/9536* (2019.01); *G06Q 10/1053* (2013.01); *G06Q 50/01* (2013.01)

(58) Field of Classification Search
    CPC .. G06Q 50/01; G06Q 10/1053; G06F 16/903; G06F 16/953; G06F 16/24578; G06F 16/9536; G06F 16/9535
    See application file for complete search history.

(56) References Cited

U.S. PATENT DOCUMENTS

| | | | |
|---|---|---|---|
| 2009/0276289 A1* | 11/2009 | Dickinson | G06Q 10/063 705/7.29 |
| 2013/0246017 A1* | 9/2013 | Heckerman | G06K 9/6278 703/2 |

(Continued)

OTHER PUBLICATIONS

Ha-Thuc, Viet, Ganesh Venkataraman, Mario Rodriguez, Shakti Sinha, Senthil Sundaram, and Lin Guo. "Personalized expertise search at LinkedIn." In 2015 IEEE International Conference on Big Data (Big Data), pp. 1238-1247. IEEE, 2015. (Year: 2015).*

(Continued)

*Primary Examiner* — Jesse P Frumkin
(74) *Attorney, Agent, or Firm* — Schwegman Lundberg & Woessner, P.A.

(57) ABSTRACT

Techniques for improving search using generalized linear mixed models are disclosed herein. In some embodiments, a computer-implemented method comprises: receiving a search query comprising at least one search term and being associated with a user; extracting features from corresponding profiles of a plurality of candidates; for each one of the candidates, generating a corresponding score based on a generalized linear mixed model comprising a generalized linear query-based model and a random effects user-based model; selecting a subset of candidates from the plurality of candidates based on the corresponding scores; and causing the selected subset of candidates to be displayed to the user in a search results page for the search query.

20 Claims, 12 Drawing Sheets

(51) Int. Cl.
*G06Q 50/00* (2012.01)
*G06Q 10/10* (2012.01)
*G06F 16/9536* (2019.01)

(56) References Cited

U.S. PATENT DOCUMENTS

| | | | | |
|---|---|---|---|---|
| 2014/0122355 A1* | 5/2014 | Hardtke | ............... | G06Q 10/105 |
| | | | | 705/321 |
| 2014/0258355 A1* | 9/2014 | Chu | ................. | G06F 17/18 |
| | | | | 708/446 |
| 2014/0358810 A1* | 12/2014 | Hardtke | ............... | G06Q 10/105 |
| | | | | 705/321 |
| 2015/0066594 A1* | 3/2015 | Li | .................... | G06Q 30/0202 |
| | | | | 705/7.31 |
| 2017/0300824 A1* | 10/2017 | Peng | ................ | G06F 16/26 |
| 2017/0323268 A1* | 11/2017 | Zhang | ............... | G06Q 10/1053 |
| 2018/0165706 A1* | 6/2018 | Feng | ................ | G06Q 30/0244 |
| 2018/0232700 A1* | 8/2018 | Li | ..................... | G06Q 10/1053 |
| 2019/0019157 A1* | 1/2019 | Saha | ................. | G06F 16/9535 |
| 2019/0050750 A1* | 2/2019 | Le | ....................... | G06N 3/08 |
| 2019/0087497 A1* | 3/2019 | Chan | ................. | G06Q 30/0201 |
| 2020/0004827 A1* | 1/2020 | Salomatin | ............ | G06F 16/438 |

OTHER PUBLICATIONS

Wu, Hao, Kun Yue, Yijian Pei, Bo Li, Yiji Zhao, and Fan Dong. "Collaborative topic regression with social trust ensemble for recommendation in social media systems." Knowledge-Based Systems 97 (2016): 111-122. (Year: 2016).*

* cited by examiner

FIG. 4

SHOWING RESULTS FOR
CUSTOM FILTERS

JOB TITLES
SOFTWARE ENGINEER
+ JOB TITLES

LOCATIONS
SAN FRANCISCO BAY AREA
+ LOCATIONS

SKILLS
MACHINE LEARNING
DATA MINING
+ SKILLS

COMPANIES
+ COMPANIES

SCHOOLS
+ SCHOOLS ATTENDED

🔍 15,112 CANDIDATES

JANE DOE
SOFTWARE ENGINEER AT ACME CORP.
SAN FRANCISCO BAY AREA
COMPUTER SCIENCE

CURRENT    SOFTWARE ENGINEER AT ACME CORP.    2013 - PRESENT
PAST          SOFTWARE ENGINEER AT WAYNE ENTERPRISES    2010 - 2013
MORE
EDUCATION  UNIVERSITY OF CALIFORNIA BERKELEY  2000 - 2004
                  SARATOGA HIGH SCHOOL
1 SHARED CONNECTION       OPEN TO NEW OPPORTUNITIES

JOHN SMITH
SOFTWARE ENGINEER AT GOTHAM INC.
SAN FRANCISCO BAY AREA
COMPUTER SCIENCE

CURRENT    SOFTWARE ENGINEER AT GOTHAM INC.    2014 - PRESENT
PAST          SOFTWARE ENGINEER AT LUTHOR CORP.    2011 - 2014
MORE
EDUCATION  STANFORD UNIVERSITY   2003 - 2007

| USER ID | USER ACTION | CONTRACT ID | CANDIDATE ID | RESPONSE |
|---------|-------------|-------------|--------------|-----------------|
| 2543 | MESSAGE | 79 | 2464 | ACCEPT AND REPLY |
| 2543 | MESSAGE | 79 | 2014 | REJECT |
| 2543 | MESSAGE | 28 | 7830 | IGNORE |
| 2543 | MESSAGE | 33 | 4 | NO RESPONSE |
| . . . | . . . | . . . | . . . | . . . |

FIG. 5

GENERALIZED LINEAR MIXED MODELS FOR IMPROVING SEARCH

TECHNICAL FIELD

The present application relates generally to methods and systems of reducing electronic resource consumption using generalized linear mixed models for search.

BACKGROUND

Generalized linear models suffer from a lack of personalization, particularly when used in the area of information retrieval, such as generating search results in response to a search query, resulting in the most relevant content being downgraded in favor of irrelevant content in the search results. As a result, users of such an information retrieval system spend a longer time of their search and request a computer system to perform actions with respect to the irrelevant content, leading to excessive consumption of electronic resources, such as a wasteful use of processing power and computational expense associated with generating and displaying irrelevant content, and a wasteful use of network bandwidth associated with transmission of messages based on irrelevant content.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 4 illustrates a graphical user interface (GUI) displaying a search results page, in accordance with an example embodiment.

FIG. 5 illustrates a stored history of user actions, in accordance with an example embodiment.

DETAILED DESCRIPTION

Figure 1:
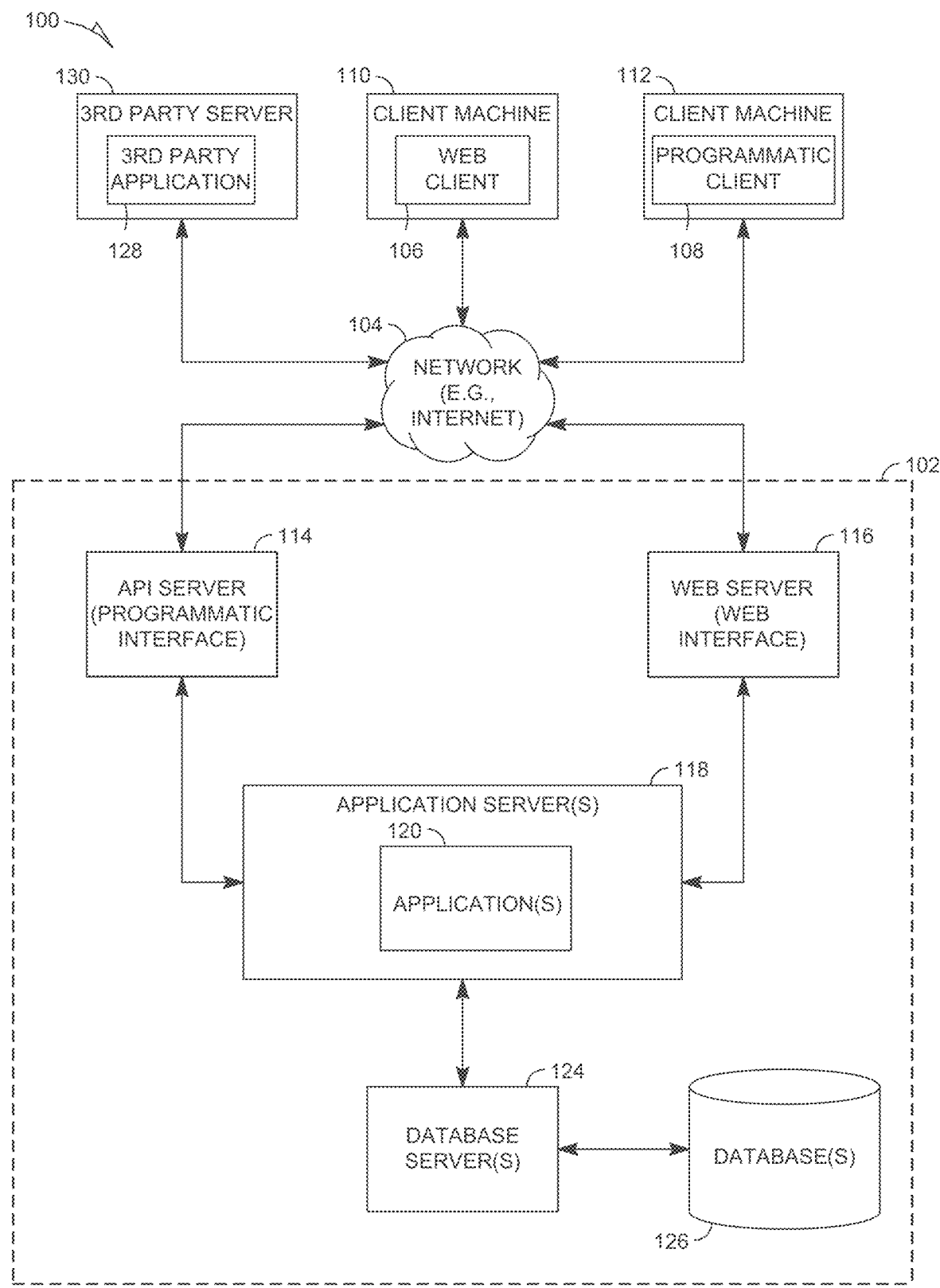
FIG. 1 is a block diagram illustrating a client-server system, in accordance with an example embodiment.

Example methods and systems of reducing electronic resource consumption using generalized linear mixed models for search are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. Some technical effects of the system and method of the present disclosure are to reduce electronic resource consumption using generalized linear mixed models for search. In some example embodiments, a specially-configured computer system conserves processing power, computational expense, and network bandwidth by using specially-configured generalized linear mixed models to generate the most relevant search results. Additionally, other technical effects will be apparent from this disclosure as well.

Any of the features disclosed herein with respect to the term "member" may also apply to other users of an online service who may not technically be members of the online service, and vice-versa.

In some example embodiments, operations are performed by a computer system (or other machine) having a memory and at least one hardware processor, with the operations comprising: receiving a search query from a computing device of a user, the search query comprising at least one search term and being received in association with a user identification identifying the user; for each one of a plurality of candidates, extracting features from a corresponding profile of the candidate stored in a database of a social networking service; for each one of the plurality of candidates, generating a corresponding score based on a generalized linear mixed model comprising a query-based model and a user-based model, the query-based model being a generalized linear model based on a search for the at least one search term in the profile of the one of the plurality of candidates, and the user-based model being a random effects model based on a history of user actions by the user directed towards candidates having profiles with features matching the features of the corresponding profile of the candidate and indications of whether the candidates to whom the user actions were directed responded to the user actions with at least one of one or more specified responses; selecting a subset of candidates from the plurality of candidates based on the corresponding scores of the subset of candidates; and causing the selected subset of candidates to be displayed on the computing device of the user in a search results page for the search query.

In some example embodiments, the search query is received in association with a task identification identifying an agreement by the user to perform a specific task for an entity, and the generalized linear mixed model further comprises a task-based model, the task-based model being a random effects model based on a history of user actions associated with the task identification directed towards candidates having profiles with features matching the features of the corresponding profile of the one of the plurality of candidates and indications of whether the candidates to whom the user actions were directed responded to the user actions with at least one of one or more specified responses.

In some example embodiments, the query-based model is a fixed effects model. In some example embodiments, the query-based model is based on at least one of term frequency and term frequency-inverse document frequency.

In some example embodiments, the features comprise at least one of educational background, employment history, industry, interests, and skills.

In some example embodiments, the user actions comprise sending messages to the candidates, and the specified response(s) comprise at least one of reading the message and sending a reply message to the user.

In some example embodiments, generating the corresponding score for each one of the plurality of candidates is performed prior to the receiving of the search query from the computing device of the user, the operations further comprise storing the generated scores in the database of the social networking service prior to the receiving of the search query from the computing device of the user, and the selecting of the subset of candidates comprises retrieving the generated scores from the database in response to the receiving of the search query, and selecting the subset of candidates based on the retrieved scores.

In some example embodiments, generating the corresponding score for each one of the plurality of candidates is performed in response to the receiving of the search query from the computing device of the user.

In some example embodiments, selecting the subset of candidates comprises ranking the plurality of candidates based on their corresponding scores, and selecting the subset of candidates based on the ranking of the plurality of candidates.

In some example embodiments, the operations further comprise: receiving an instruction from the computing device of the user to perform an action directed towards at least one of the subset of candidates, performing the action directed towards at least one of the subset of candidates based on the instruction; determining whether at least one of the subset of candidates to whom the action was directed responded to the action with at least one of the one or more specified responses; for each one of at least one of the subset of candidates to whom the action was directed, storing an indication of whether at least one of the subset of candidates responded to the action with at least one of the one or more specified responses in the database of the social networking service, and using a machine learning algorithm to modify the user-based model based on the stored indications of whether at least one of the subset of candidates responded to the action with at least one of the specified responses.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
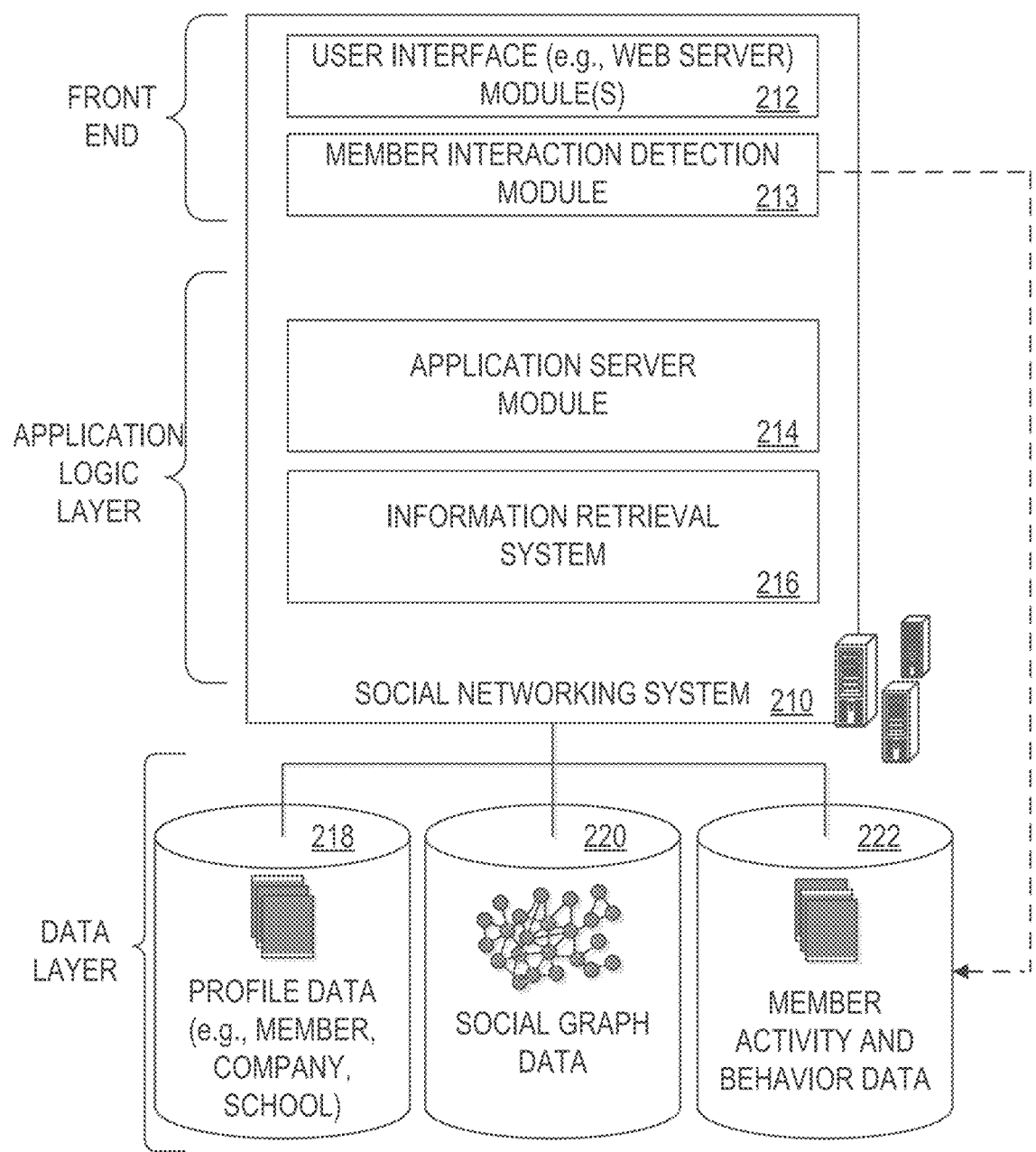
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as an information retrieval system 216, for use in social networking system 210, consistent with some embodiments of the present disclosure. In some embodiments, the information retrieval system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the information retrieval system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the information retrieval system 216.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the information retrieval system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
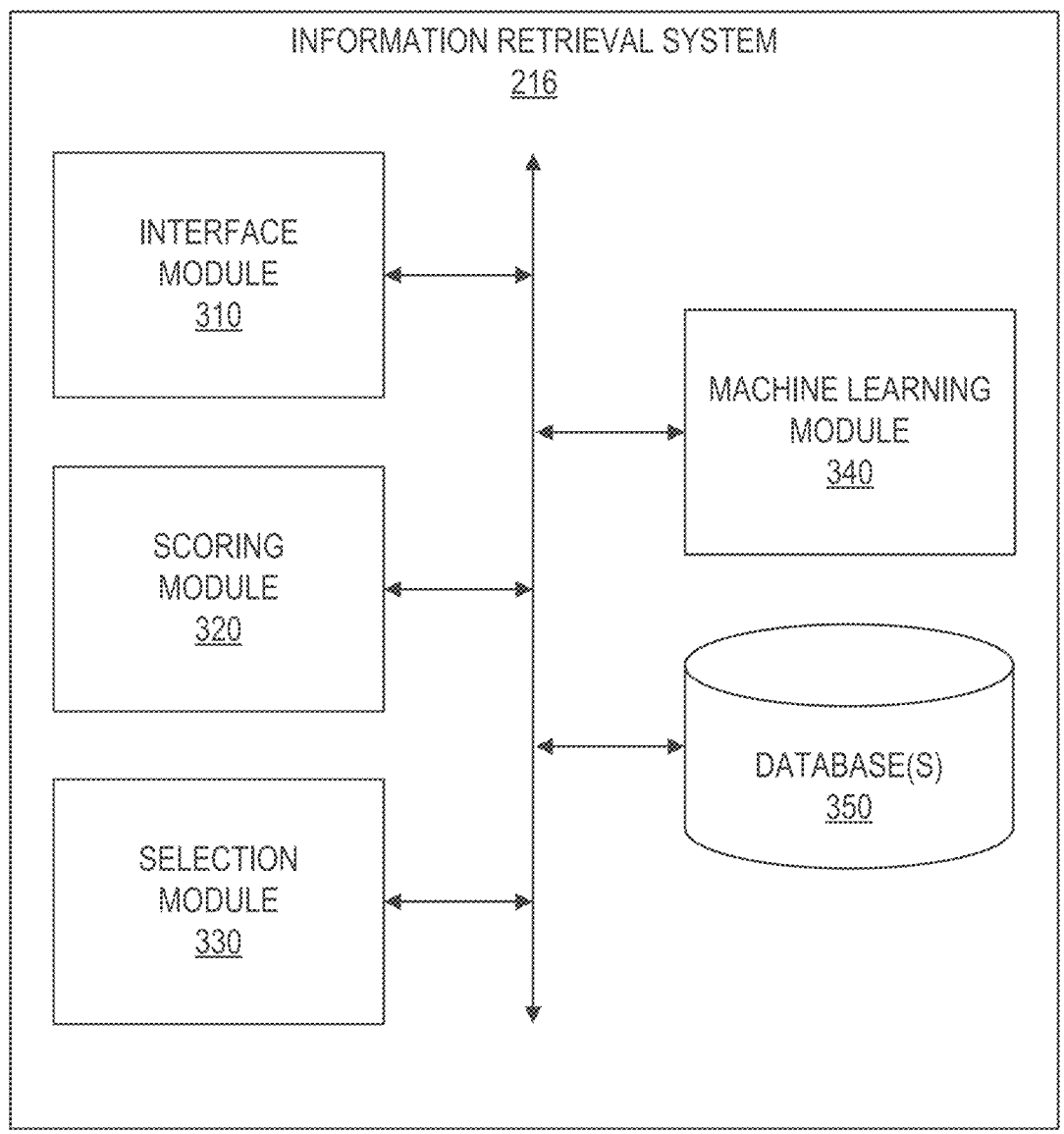
FIG. 3 is a block diagram illustrating components of an information retrieval system, in accordance with an example embodiment.

FIG. 3 is a block diagram illustrating components of the information retrieval system 216, in accordance with an example embodiment. In some embodiments, the information retrieval system 216 comprises any combination of one or more of an interface module 310, a scoring module 320, a selection module 330, a machine learning module 340, and one or more database(s) 350. The modules 310, 320, 330, and 340, and the database(s) 350 can reside on a computer system, or other machine, having a memory and at least one processor (not shown). In some embodiments, the modules 310, 320, 330, and 340, and the database(s) 350 can be incorporated into the application server(s) 118 in FIG. 1. In some example embodiments, the database(s) 350 is incorporated into database(s) 126 in FIG. 1 and can include any combination of one or more of databases 218, 220, and 222 in FIG. 2. However, it is contemplated that other configurations of the modules 310, 320, 330, and 340, and the database(s) 350, are also within the scope of the present disclosure.

In some example embodiments, one or more of the modules 310, 320, 330, and 340 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310, 320, 330, and 340 is configured to receive user input. For example, one or more of the modules 310, 320, 330, and 340 can present one or more GUI elements (e.g., drop-down menu, selectable buttons, text field) with which a user can submit input.

In some example embodiments, one or more of the modules 310, 320, 330, and 340 is configured to perform various communication functions to facilitate the functionality described herein, such as by communicating with the social networking system 210 via the network 104 using a wired or wireless connection. Any combination of one or more of the modules 310, 320, 330, and 340 may also provide various web services or functions, such as retrieving information from the third party servers 130 and the social networking system 210. Information retrieved by the any of the modules 310, 320, 330, and 340 may include profile data corresponding to users and members of the social networking service of the social networking system 210.

Additionally, any combination of one or more of the modules 310, 320, 330, and 340 can provide various data functionality, such as exchanging information with database(s) 350 or servers. For example, any of the modules 310, 320, 330, and 340 can access member profiles that include profile data from the database(s) 350, as well as extract attributes and/or characteristics from the profile data of member profiles. Furthermore, the one or more of the modules 310, 320, 330, and 340 can access social graph data and member activity and behavior data from database(s) 350, as well as exchange information with third party servers 130, client machines 110, 112, and other sources of information.

In some example embodiments, the information retrieval system 216 is configured to generate, employ, and modify generalized linear mixed models. The generalized linear mixed models of the present disclosure are an improvement on generalized linear models In addition to linear or logistic regression on overall data, the generalized linear models of the present disclosure add new entity-level regression models to a generalized linear model, which introduces personalization for entities. In cases where data is abundant, such as in use cases where a recruiter is searching for job candidates, the generalized linear mixed models of the present disclosure provide a significant improvement in relevance of search results, as they can be used to build predictive entity-level models for entity personalization.

In some example embodiments, the generalized linear mixed models of the present disclosure use model variants to improve recruiter search relevance. For example, given historical recruiter queries in recruiter search situations, recruiter/candidate features, and the search result list members who have user actions directed towards them, such as messages from the recruiter being sent to the candidates, a ranking model may be built to list the most relevant members in recruiter search results for future queries. In order to add entity-centralized personalization to these models, generalized linear mixed models including a generalized linear query-based model and one or more random effects models for different entities, including recruiter, candidate, and contract may be used.

One advantageous technical effect of the features of the present disclosure include is deep personalization. For example, the generalized linear mixed models of the present disclosure introduce deep personalization in recruiter search for entities including the recruiter, the candidate, and the agreement of the recruiter to perform a task (e.g., a contract).

Other advantageous technical effects of the features of the present disclosure include, but are not limited to, scalability and speed. For example, model training and scoring for the generalized linear mixed models of the present disclosure are faster and more scalable than for other models.

In some example embodiments, the information retrieval system 216 is configured to select candidates based at least in part on a search query submitted by a user and to cause the selected candidates to be displayed to the user on a search results page. FIG. 4 illustrates a graphical user interface (GUI) 400 displaying a search results page, in accordance with an example embodiment. In GUI 400, the user (e.g., a recruiter) may submit one or more terms of a search query using one or more user interface elements. For example, the user may submit the term(s) by either entering text into a search field 420 or by using a custom search filters panel 430 via which the user may select and enter the terms based on the corresponding category of the terms (e.g., job titles, locations, skills, companies, schools). In response to the search query submitted by the user, the information retrieval system 216 may cause selected candidates 410 (e.g., job candidates) to be displayed on the search results page.

In some example embodiments, the user can select one or more of the candidates 410 that are displayed and submit an instruction that the information retrieval system 216 perform a user action directed towards the candidate(s) selected by the user. For example, the user action may comprise sending a message to the candidate(s) via the social networking service. In some example embodiments, the social networking service allows the user to send certain types of messages to candidates to whom the user is not connected on the social networking service. These messages may be used by the user to contact anyone outside of the user's network (e.g., anyone the user is not connected to). One example of such messages is LinkedIn's InMails. However, other types of messages are also within the scope of the present disclosure. The messages may include information regarding an open position for which the user is recruiting. Candidates who receive the messages may accept the messages and read them via the social networking service, send replies to the messages via the social networking service, decline or reject the messages via the social networking service, ignore the messages via the social networking service, or simply take no action regarding the messages.

Referring back to FIG. 3, in some example embodiments, the interface module 310 is configured to receive a search query from a computing device of a user. The search query may comprise at least one search term In some example embodiments, the search query is received by the interface module 310 in association with a user identification identifying the user (e.g., a recruiter ID). In some example embodiments, the search query is received by the interface module 310 in association with a task identification (e.g., a contract ID) identifying an agreement (e.g., a contract) by the user to perform a specific task for an entity (e.g., to find job candidates for one or more open positions at a company).

In some example embodiments, the scoring module 320 is configured to, for each one of a plurality of candidates, extract features from a corresponding profile of the candidate stored in a database of a social networking service. For example, the scoring module 320 may extract any of the data from databases 218, 220, and 222 of FIG. 2 as features to be used by the scoring module 320 in further processing. In some example embodiments, the extracted features comprise at least one of educational background (e.g., schools that the candidate attended, fields of study), employment history (e.g., the companies from the last N positions that the candidate held, the positions that the candidate held at those companies, the functions of the positions that the candidate held), industry, interests, and skills. However, other features are also within the scope of the present disclosure.

In some example embodiments, for each one of the plurality of candidates, the scoring module 320 is configured to generate a corresponding score based on a generalized linear mixed model comprising a generalized linear query-based model and one or more random effects models for different entities, such as recruiter (e.g., the user), candidate, and contract (e.g., the agreement by the user to perform a specific task for an entity).

In some example embodiments, the query-based model is a fixed effects model that uses query-level features or learning-to-rank features. For example the query-level features may include, but are not limited to, a fraction of terms from the search query that match a title of the profile of the candidate that is being scored, and a number of terms from the search query that match a current company included in the profile of the candidate that is being scored. In some example embodiments, the query-based model is based on a search for the search term(s) of the search query in the profile of the candidate. In some example embodiments, the query-based model is based on at least one of term frequency (e.g., a raw count of a term in a document) and term frequency-inverse document frequency (e.g., a measure of how much information the search term provides, that is, whether the search term is common or rare across all documents, such as a logarithmically scaled inverse fraction of the documents that contain the search term, obtained by dividing the total number of documents by the number of documents containing the search term, and then taking the logarithm of that quotient).

In some example embodiments, the one or more random effects models comprise at least one of a user-based model and a task-based model. Other types of random effects models may also be incorporated into the generalized linear mixed models of the present disclosure.

In some example embodiments, the user-based model comprises a random effects model based on a history of user actions by the user directed towards candidates having profiles with features matching the features of the corresponding profile of the candidate being scored and indications of whether the candidates to whom the user actions were directed responded to the user actions with at least one of one or more specified responses.

In some example embodiments, the task-based model comprises a random effects model based on a history of user actions associated with the task identification directed towards candidates having profiles with features matching the features of the corresponding profile of the candidate being scored and indications of whether the candidates to whom the user actions were directed responded to the user actions with at least one of one or more specified responses.

In some example embodiments, the history of user actions used for the user-based model and the task-based model comprises a history of messages sent to the candidates being scored. The history may be stored in the database(s) 350. FIG. 5 illustrates a stored history of user actions 500, in accordance with an example embodiment. In FIG. 5, the stored history 500 comprises a corresponding identification of the user that directed the user action (e.g., user ID), an indication of the type of user action (e.g., a message), a corresponding task identification associated with the requested action (e.g., contract ID), an identification of the candidate to whom the user action was directed (e.g., candidate ID), and an indication of how the candidate responded to the user action (e.g., accept and reply, reject or decline, ignore, no response). In some example embodiments, the indication of how the candidate response to the user action indicates whether the candidate responded with one or more specified actions (e.g., accepted message, read message, sent a reply to the user) or with none of the specified actions (e.g., rejected or declined, ignored, no response).

Figure 6:
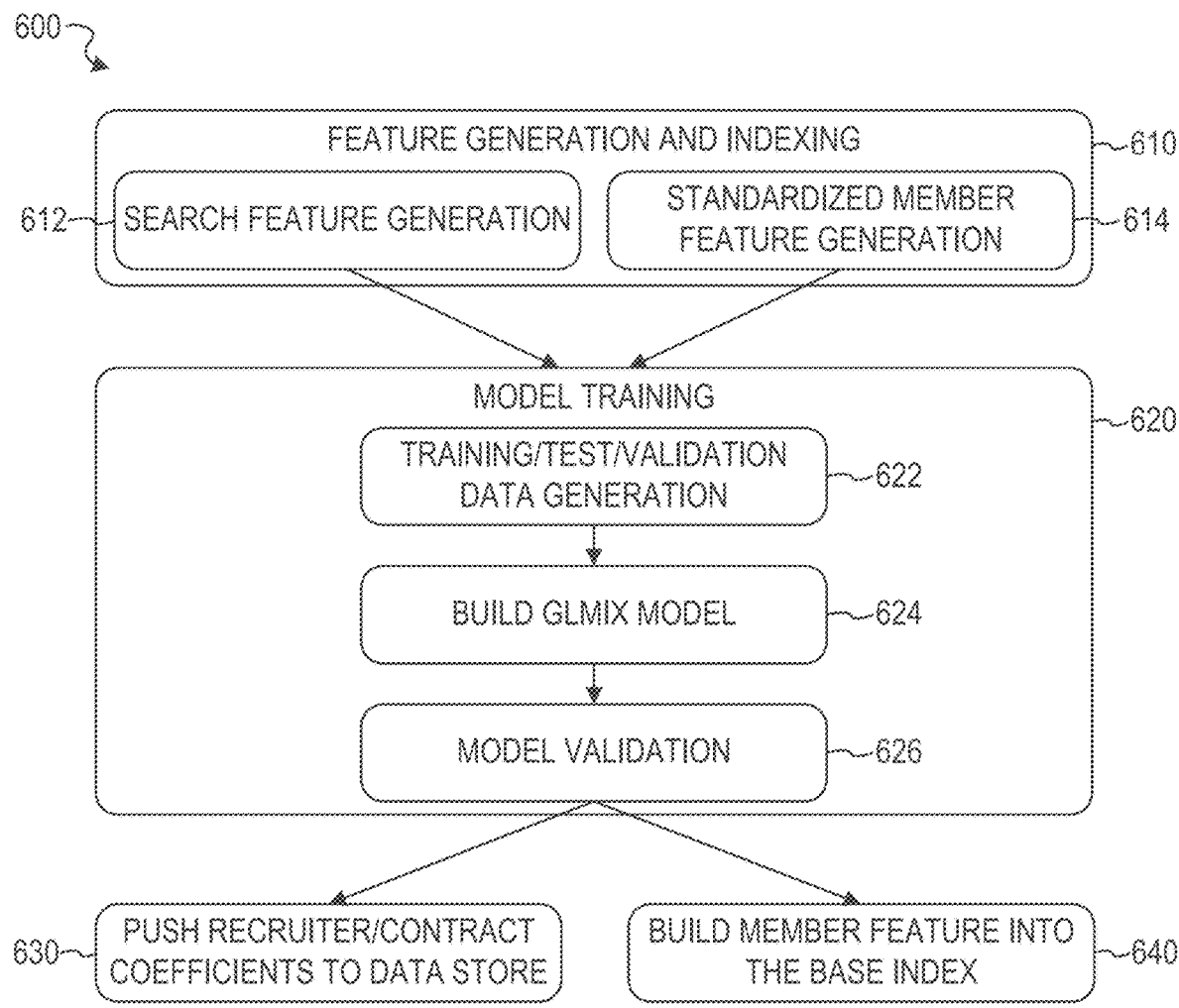
FIG. 6 is a flow diagram illustrating an overview of operations in a modelling workflow for a generalized linear mixed model, in accordance with an example embodiment.

FIG. 6 is a flow diagram illustrating an overview of operations in a modelling workflow 600 for a generalized linear mixed model, in accordance with an example embodiment. Workflow 600 can be performed by processing logic that can comprise hardware (e.g., circuitry, dedicated logic, programmable logic, microcode, etc.), software (e.g., instructions run on a processing device), or a combination thereof. In one implementation, the workflow 600 is performed by the information retrieval system 216 of FIGS. 2-3, or any combination of one or more of its modules, as described above.

At operation 610, the information retrieval system 216 performs feature generation and indexing. In some example embodiments, two feature sets are used in modelling a generalized linear mixed model for a recruiter search use case: search features and standardized member features. The search features comprise query-dependent features, such as the number of query terms matching a title of the candidate being scored. At operation 612, the search features are generated. Standardized member features include candidates' skills, candidates' education-derived data (e.g., field of study, degree, school), candidates' position-derived data (e.g., function, company, seniority, company's seniority, top three titles based on inferred scores), candidates' interface language, region, position seniority, and company size. At operation 614, the standardized member features are generated. The search features and standardized member features are indexed in a data storage.

At operation 620, the information retrieval system 216 performs model training. The information retrieval system 216 may build generalized linear mixed models for recruiter search use cases at a periodic cadence (e.g., daily). At operation 622, the information retrieval system 216 generates training/test/validation datasets on a given day d. In order to build the generalized linear mixed model on day d, the information retrieval system 216 first generates training/ test/validation datasets using a timeline. On day d, the information retrieval system 216 uses a 6-week time period between [(d−8 weeks), (d−2 weeks−1)] to generate training/test dataset combinations. Then, the information retrieval system 216 randomly splits this dataset into a training set and a test set using uniform sampling (e.g., no time-wise split). The test set may be used to report area under the curve (AUC) values and weighted AUC values for the generalized linear mixed model AUC is used in classification analysis in order to determine which of the used models predicts the classes the best. The last 2-week time period, between [(d−2 weeks). (d−1)] is used to generate validation dataset. This dataset is used to report values for messages sent via the social networking service for candidates listed in the first page of search results before the viewer of the page has to scroll down (e.g., the first 5 candidates listed on the first page of the search results page) and for all of the candidates listed in the first page of the search results (e.g., the first 25 candidates of the search results) and values for messages that have been accepted for candidates listed in the first page of search results before the viewer of the page has to scroll down (e.g., the first 5 candidates listed on the first page of the search results page) and for all of the candidates listed in the first page of the search results (e.g., the first 25 candidates of the search results).

At operation 624, the information retrieval system 216 builds a generalized linear mixed model variant using this training/test data split. In some example embodiments, the information retrieval system 216 uses global model regularization parameters and random effects model regularization parameters for the generalized linear mixed model variant. A search space of multiple parameter sets is created, resulting in multiple different generalized linear mixed models from which the information retrieval system 216 may select the best model as the one that returns the highest key metric value, such as the highest value for accepted messages (e.g., accepted InMails).

At operation 626, the information retrieval system 216 validates the selected generalized linear mixed model using evaluation metrics including AUC, weighted AUC, values for messages sent via the social networking service for candidates listed in the first page of search results before the viewer of the page has to scroll down (e.g., the first 5 candidates listed on the first page of the search results page), and for all of the candidates listed in the first page of the search results (e.g., the first 25 candidates of the search results), which can be referred to herein as "InMail Sent@k values where k∈{5, 25}." and values for messages that have been accepted for candidates listed in the first page of search results before the viewer of the page has to scroll down (e.g., the first 5 candidates listed on the first page of the search results page) and for all of the candidates listed in the first page of the search results (e.g., the first 25 candidates of the search results), which can be referred to herein as "InMail Accept@k values where k∈{5, 25}." After the generalized linear mixed model is built, the information retrieval system 216 may pass it through the following checks, which will return alarms in case of failure:

1. AUC and weighted AUC measured on test set has to be above a given threshold.
2. InMail Sent@k and InMail Accept@k values, where k∈{5, 25}, has to be above a minimum threshold for the following values: minimum metric value in the last week, minimum metric value for the same day last year (check leap year).
3. Generalized linear mixed model overfitting check, in some example embodiments, with cross-validation.

If the information retrieval system 216 determines that the new generalized linear mixed model passes the model validation checks at operation 626 and determines that it has a sufficiently high predictive accuracy, then the information retrieval system 216 deploys the generalized linear mixed model for the day to a data storage. Otherwise, in case of failure, the generalized linear mixed model will revert back to the validated closest-to-date generalized linear mixed model.

At operation 630, based on the generalized linear mixed model passing the model validation checks at operation 626, the information retrieval system 216 pushes coefficients of the model (e.g., user/recruiter coefficients, contract coefficients) to a data store for subsequent retrieval and use, and, at operation 640, the information retrieval system 216 builds the standardized member features into a base index of the information retrieval system 216.

In some example embodiments, the generalized linear mixed model comprises a global model and one or more random effects models. In some example embodiments, the generalized linear mixed model consists of a global model, a per-recruiter model, and a per-contract model. Random effects models are large in size, as they have a model for each distinct record within the entity in the training set. In some example embodiments, the information retrieval system 216 uses the following generalized linear mixed model for recruiter search use cases, where the per-recruiter model and the per-contract model for a given (requestId, contextId, recruiterId, candidateId, contractId), represented by (r,c,re,ca,co) is formulated as follows:

$$g(P_{r,c,re,ca,co}) = \beta_{global} * f_{ltr}^{r,c,re,ca,co} + \beta_{re} * f_{mem}^{ca} + \beta_{co} * f_{mem}^{ca},$$

where g( ) is the log it function, $P_{r,c,re,ca,co}$ is the probability of candidate ca to be a good match for the search query by recruiter re given query request r and context c. The first term $\beta_{global} * f_{ltr}^{r,c,re,ca,co}$ is the global model score with $\beta_{global}$ as the global model coefficients, the second term $\beta_{re} * f_{mem}^{ca}$ is the per-recruiter model score with $\beta_{re}$ as the per-recruiter model coefficients for recruiter re, and the third term $\beta_{co} * f_{mem}^{ca}$ is the per-contract model score with $\beta_{co}$ as the per-contract model coefficients for contract co.

In some example embodiments, given a search query identified by (requestId, contextId, recruiterId, candidateId, contractId) tuple, the information retrieval system 216 uses query-specific learning-to-rank (LTR) features to build the global model component of the generalized linear mixed model. The global model is represented by the first term in the equation above, which is $\beta_{global} * f_{ltr}^{r,c,re,ca,co}$, where $f_{ltr}^{r,c,re,ca,co}$ corresponds to LTR feature for the query identified by (r,c,re,ca,co), and $\beta_{global}$ represents global model coefficients. In some example embodiments, the global model coefficients and features used in the generalized linear mixed model are summarized as follows:

$\beta_{global}$: Global model coefficient vector.
$f_{ltr}^{r,c,re,ca,co}$: LTR feature vector for the search query identified by (r,c,re,ca,co).

In some example embodiments, given a search query identified by (requestId, contextId, recruiterId, candidateId, contractId) tuple, the information retrieval system 216 uses standardized member features of candidates to build a per-recruiter model component of the generalized linear mixed model. The per-recruiter model represented by the second term in the equation above, which is $\beta_{re} * f_{mem}^{ca}$, where $f_{mem}^{ca}$ corresponds to standardized member feature vector for candidate ca for the query identified by (r,c,re,ca,co), and $\beta_{re}$ represents per-recruiter model coefficient vector for recruiter re. In some example embodiments, the per-recruiter model coefficients and features used in the per-recruiter model for recruiter re are summarized as follows:

$\beta_{re}$: Per-recruiter model coefficient vector for recruiter re.

$f_{mem}^{ca}$: Standardized member features for candidate ca.

In some example embodiments, given a search query identified by (requestId, contextId, recruiterId, candidateId, contractId) tuple, the information retrieval system 216 uses standardized member features of candidates to build a per-contract model component of the generalized linear mixed model. The per-contract model is represented by the third term in equation above, which is $\beta_{co}*f_{mem}^{ca}$, where $f_{mem}^{ca}$ corresponds to standardized member feature vector for candidate ca for the query identified by (r,c,re,ca,co), and $\beta_{co}$ represents per-contract model coefficient vector for contract co. In some example embodiments, the per-recruiter model coefficients and features used in the per-contract model for contract co are summarized as follows:

$\beta_{co}$: Per-contract model coefficient vector for contract co.

$f_{mem}^{ca}$: Standardized member features for candidate ca.

It is contemplated that other configurations of a generalized linear mixed model are also within the scope of the present disclosure and may be generated and employed by information retrieval system 216.

Figure 7:
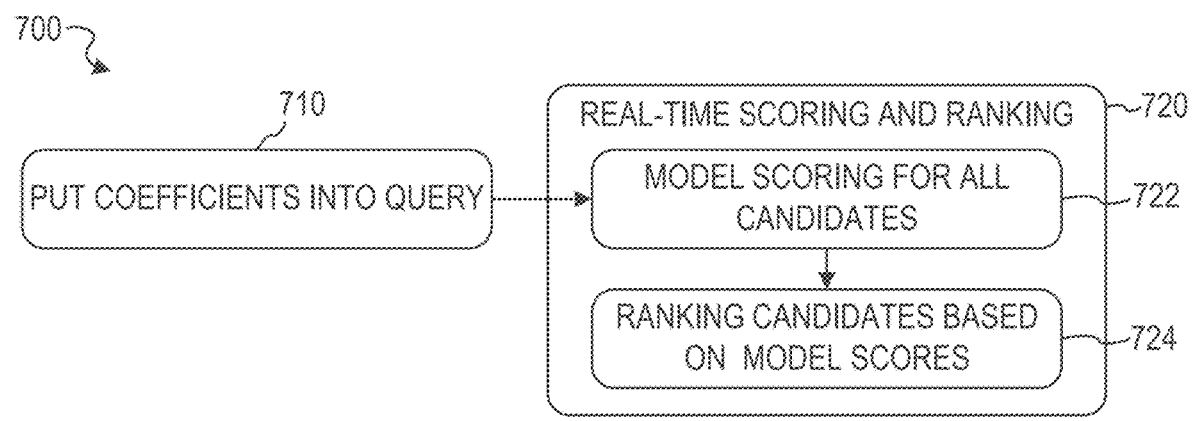
FIG. 7 is a flow diagram illustrating an overview of operations in a scoring workflow for a generalized linear mixed model, in accordance with an example embodiment.

FIG. 7 is a flow diagram illustrating an overview of operations in a scoring workflow 700 for a generalized linear mixed model, in accordance with an example embodiment. Workflow 700 can be performed by processing logic that can comprise hardware (e.g., circuitry, dedicated logic, programmable logic, microcode, etc.), software (e.g., instructions run on a processing device), or a combination thereof. In one implementation, the workflow 700 is performed by the information retrieval system 216 of FIGS. 2-3, or any combination of one or more of its modules, as described above.

At operation 710, the information retrieval system 216 retrieves the coefficients stored in the data store at operation 630 of FIG. 6 for use with a received search query. At operation 720, the information retrieval system 216 performs real-time scoring and ranking in response to the received search query. At operation 722, for a given recruiter search uniquely identified by (requestId, contextId, recruiterId) triple, the information retrieval system 216 scores all candidates (e.g., members of the social networking service) using the generalized linear mixed model (e.g., global model+per-recruiter model+per-contract model) using the retrieved model coefficients. At operation 724, the information retrieval system 216 ranks search results by their scores generated using the generalized linear mixed model.

Referring back to FIG. 3, in some example embodiments, the scoring module 320 is configured to generate the corresponding score for each one of the plurality of candidates prior to the receiving of the search query from the computing device of the user. In such example embodiments, the scoring module 320 stores the generated scores in the database(s) 350 of the social networking service prior to the receiving of the search query from the computing device of the user.

In some example embodiments, the scoring module 320 is configured to generate the corresponding score for each one of the plurality of candidates in response to the receiving of the search query from the computing device of the user.

In some example embodiments, the selection module 330 is configured to select a subset of candidates from the plurality of candidates based on the corresponding scores of the subset of candidates. In some example embodiments, the selection module 330 retrieves the generated scores from the database(s) 350 in response to the receiving of the search query, and selects the subset of candidates based on the retrieved scores. In some example embodiments, the selection module 330 is configured to rank the plurality of candidates based on their corresponding scores, and select the subset of candidates based on the ranking of the plurality of candidates. For example, the selection module 330 may select the top twenty-five highest scored candidates as the subset of candidates.

In some example embodiments, the interface module 310 is configured to cause the selected subset of candidates to be displayed on the computing device of the user in a search results page for the search query (e.g., communicating the selected subset of candidates to the computing device with instructions to display the selected subset of candidates to the user).

In some example embodiments, the interface module 310 is configured to receiving an instruction from the computing device of the user to perform an action directed towards at least one of the subset of candidates. For example, the user may submit a request to send a message to one or more of the displayed candidates via the social networking service. In some example embodiments, the interface module 310 is further configured to perform the action directed towards the candidate(s) based on the instruction from the computing device of the user. For example, the interface module 310 may transmit a message from the user to the candidate(s). In some example embodiments, the interface module 310 is configured to determine whether the candidate(s) to whom the action was directed responded to the action with at least one of one or more specified responses, and store an indication of whether the candidate(s) responded to the action with at least one of the one or more specified responses in the database(s) 350 of the social networking service.

In some example embodiments, the machine learning module 340 is configured to use a machine learning algorithm to modify the random effects model(s) of the generalized linear mixed model (e.g., the user-based model and/or the task-based model) based on the stored indications of whether the at least one of the subset of candidates responded to the action with at least one of the one or more specified responses, such as in operation 620 of FIG. 6 discussed above.

Figure 8:
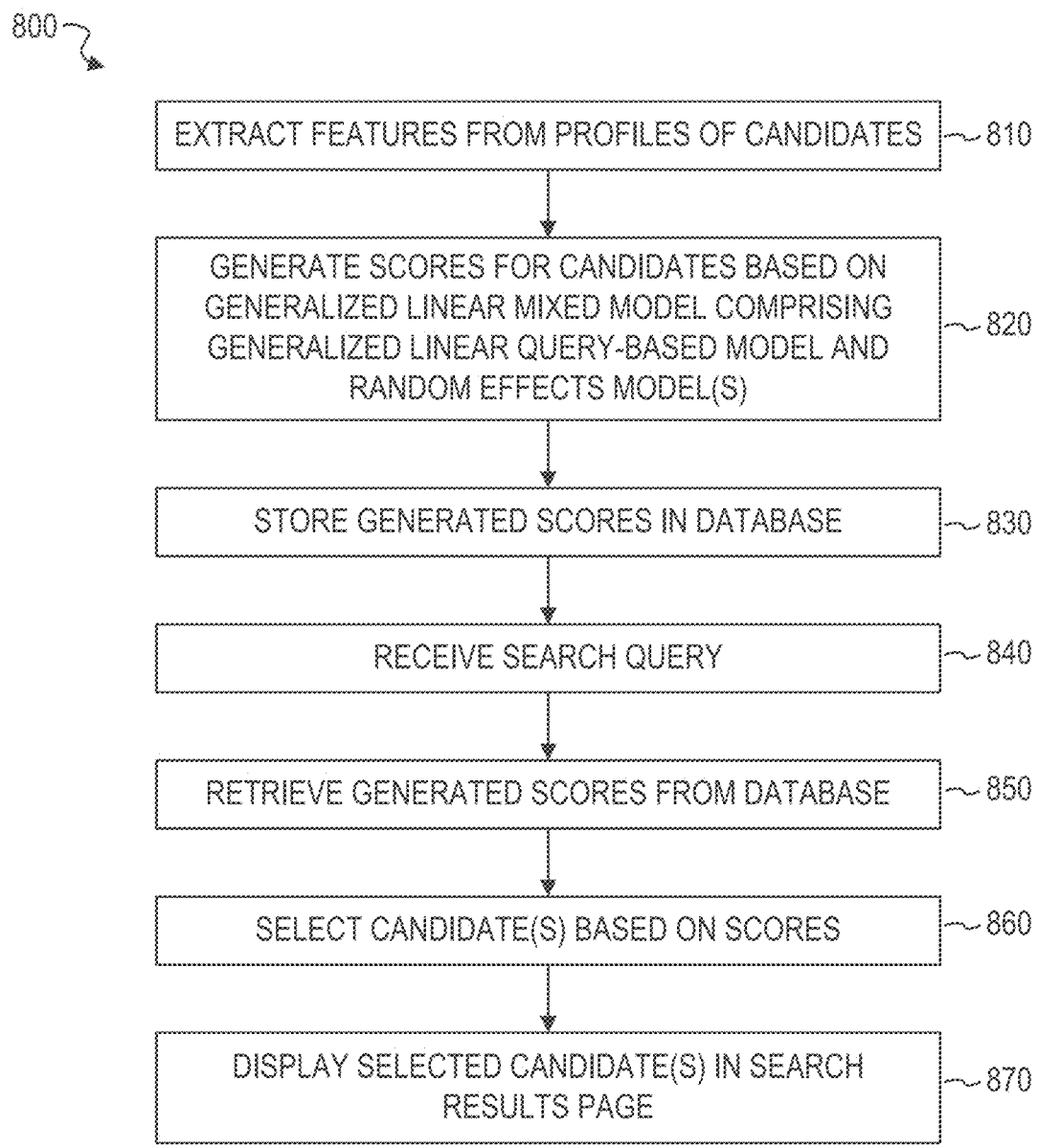
FIG. 8 is a flowchart illustrating a method of using a generalized linear mixed model for search, in accordance with an example embodiment.

FIG. 8 is a flowchart illustrating a method of using a generalized linear mixed model for search, in accordance with an example embodiment. Method 800 can be performed by processing logic that can comprise hardware (e.g., circuitry, dedicated logic, programmable logic, microcode, etc.), software (e.g., instructions run on a processing device), or a combination thereof. In one implementation, the method 800 is performed by the information retrieval system 216 of FIGS. 2-3, or any combination of one or more of its modules, as described above.

In the example embodiment of FIG. 8, the scores for candidates are generated and stored offline prior to the information retrieval system 216 receives a search query for which the scores will be used to select candidates.

At operation 810, for each one of a plurality of candidates, the information retrieval system 216 extracts features from a corresponding profile of the candidate stored in a database of a social networking service.

At operation 820, for each one of the plurality of candidates, the information retrieval system 216 generates a corresponding score based on a generalized linear mixed model comprising a query-based model and one or more random effects models. In some example embodiments, the query-based model comprises a generalized linear model based on a search for at least one search term in the profile of the one of the plurality of candidates for which the score is being generated. In some example embodiments, the random effects model(s) comprise one or more of a user-based model and a task-based model. In some example embodiments, the user-based model is based on a history of user actions by the user directed towards candidates having profiles with features matching the features of the corresponding profile of the one of the plurality of candidates for whom the score is being generated and indications of whether the candidates to whom the user actions were directed responded to the user actions with at least one of the one or more specified responses. In some example embodiments, the task-based model is based on a history of user actions associated with the task identification directed towards candidates having profiles with features matching the features of the corresponding profile of the one of the plurality of candidates for whom the score is being generated and indications of whether the candidates to whom the user actions were directed responded to the user actions with at least one of the one or more specified responses.

At operation 830, the information retrieval system 216 stored the generated scores in one or more databases (e.g., database(s) 350 in FIG. 3).

At operation 840, the information retrieval system 216 receives a search query from a computing device of a user. The search query comprises at least one search term and is received in association with at least one of a user identification identifying the user and a task identification identifying an agreement by the user to perform a specific task for an entity.

At operation 850, the information retrieval system 216 retrieves at least a portion of the generated scores stored in the database(s) based on search query. For example, the information retrieval system 216 may retrieve scores corresponding to the user identification and/or scores corresponding to the task identification, depending on which random effects model(s) were used in generating the scores.

At operation 860, the information retrieval system 216 selects a subset of candidates from the plurality of candidates based on the corresponding scores of the subset of candidates. For example, the information retrieval system 216 may select the top N highest scoring candidates, where N is a positive integer.

At operation 870, the information retrieval system 216 causes the selected subset of candidates to be displayed on the computing device of the user in a search results page for the search query.

It is contemplated that any of the other features described within the present disclosure can be incorporated into method 800.

Figure 9:
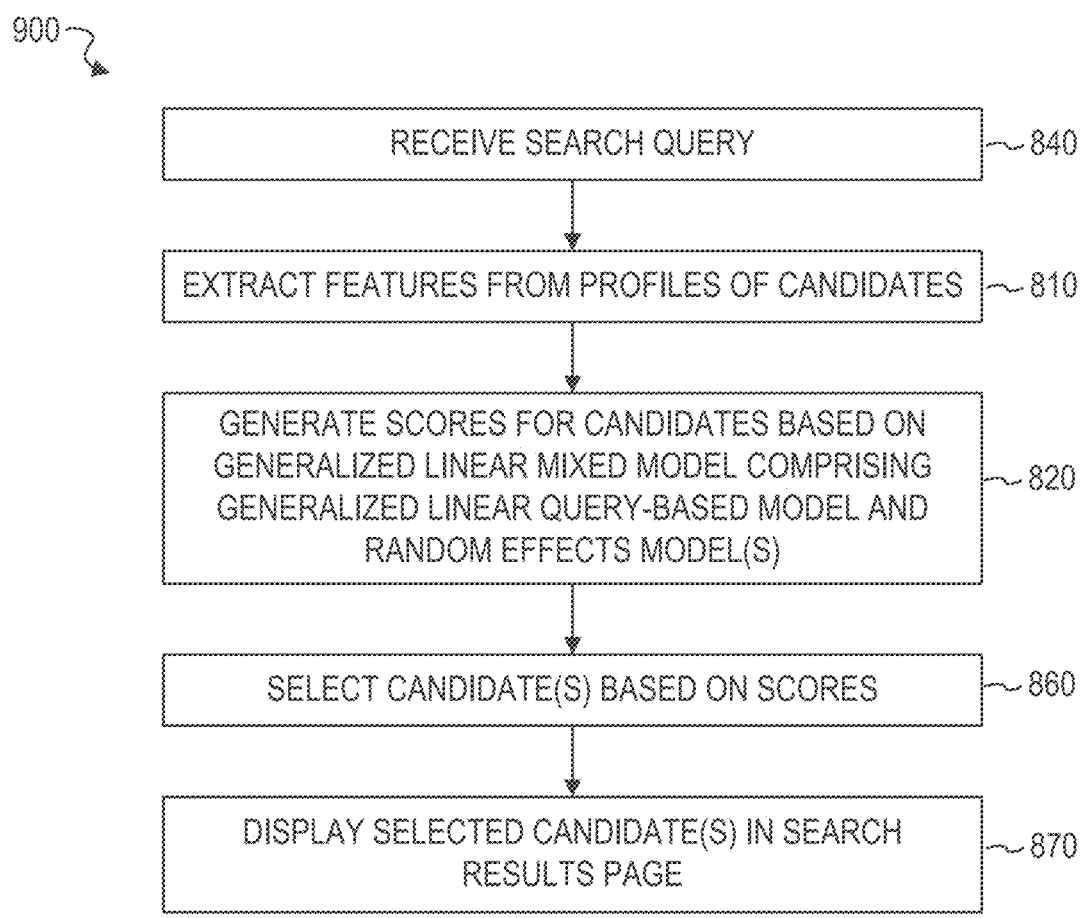
FIG. 9 is a flowchart illustrating another method of using a generalized linear mixed model for search, in accordance with an example embodiment.

FIG. 9 is a flowchart illustrating another method of using a generalized linear mixed model for search, in accordance with an example embodiment. Method 900 can be performed by processing logic that can comprise hardware (e.g., circuitry, dedicated logic, programmable logic, microcode, etc.), software (e.g., instructions run on a processing device), or a combination thereof. In one implementation, the method 900 is performed by the information retrieval system 216 of FIGS. 2-3, or any combination of one or more of its modules, as described above.

In the example embodiment of FIG. 9, the scores for candidates are generated in real-time in response to the information retrieval system 216 receiving a search query for which the scores will be used to select candidates.

At operation 840, the information retrieval system 216 receives a search query from a computing device of a user. The search query comprises at least one search term and is received in association with at least one of a user identification identifying the user and a task identification identifying an agreement by the user to perform a specific task for an entity.

At operation 810, for each one of a plurality of candidates, the information retrieval system 216 extracts features from a corresponding profile of the candidate stored in a database of a social networking service.

At operation 820, for each one of the plurality of candidates, the information retrieval system 216, generates a corresponding score based on a generalized linear mixed model comprising a query-based model and one or more random effects models. In some example embodiments, the query-based model comprises a generalized linear model based on a search for at least one search term in the profile of the one of the plurality of candidates for which the score is being generated. In some example embodiments, the random effects model(s) comprise one or more of a user-based model and a task-based model. In some example embodiments, the user-based model is based on a history of user actions by the user directed towards candidates having profiles with features matching the features of the corresponding profile of the one of the plurality of candidates for whom the score is being generated and indications of whether the candidates to whom the user actions were directed responded to the user actions with at least one of the one or more specified responses. In some example embodiments, the task-based model is based on a history of user actions associated with the task identification directed towards candidates having profiles with features matching the features of the corresponding profile of the one of the plurality of candidates for whom the score is being generated and indications of whether the candidates to whom the user actions were directed responded to the user actions with at least one of the one or more specified responses.

At operation 860, the information retrieval system 216 selects a subset of candidates from the plurality of candidates based on the corresponding scores of the subset of candidates. For example, the information retrieval system 216 may select the top N highest scoring candidates, where N is a positive integer.

At operation 870, the information retrieval system 216 causes the selected subset of candidates to be displayed on the computing device of the user in a search results page for the search query.

It is contemplated that any of the other features described within the present disclosure can be incorporated into method 700.

Figure 10:
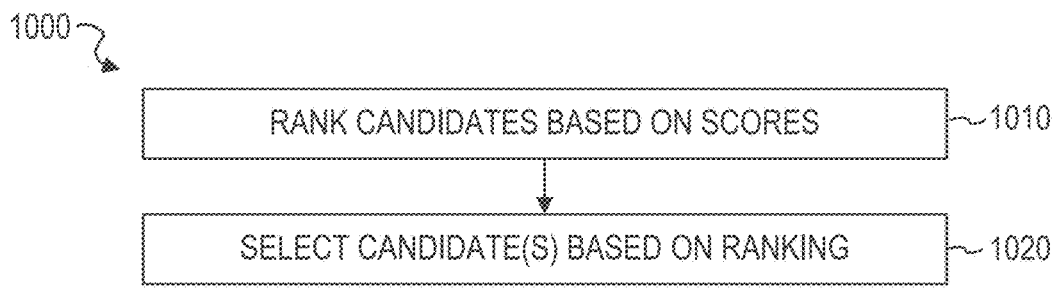
FIG. 10 is a flowchart illustrating a method of selecting a subset of candidates, in accordance with an example embodiment.

FIG. 10 is a flowchart illustrating a method of selecting a subset of candidates, in accordance with an example embodiment. Method 800 can be performed by processing logic that can comprise hardware (e.g., circuitry, dedicated logic, programmable logic, microcode, etc.), software (e.g., instructions run on a processing device), or a combination thereof. In one implementation, the method 800 is performed by the information retrieval system 216 of FIGS. 2-3, or any combination of one or more of its modules, as described above.

At operation 1010, the information retrieval system 216 ranks the plurality of candidates based on their corresponding scores.

At operation 1020, the information retrieval system 216 selects the subset of candidates based on the ranking of the plurality of candidates.

It is contemplated that any of the other features described within the present disclosure can be incorporated into method 1000.

FIG. 1 is a flowchart illustrating yet another method of using a generalized linear mixed model for search, in accordance with an example embodiment. Method 1100 can be performed by processing logic that can comprise hardware (e.g., circuitry, dedicated logic, programmable logic, microcode, etc.), software (e.g., instructions run on a processing device), or a combination thereof. In one implementation, the method 1100 is performed by the information retrieval system 216 of FIGS. 2-3, or any combination of one or more of its modules, as described above.

Figure 11:
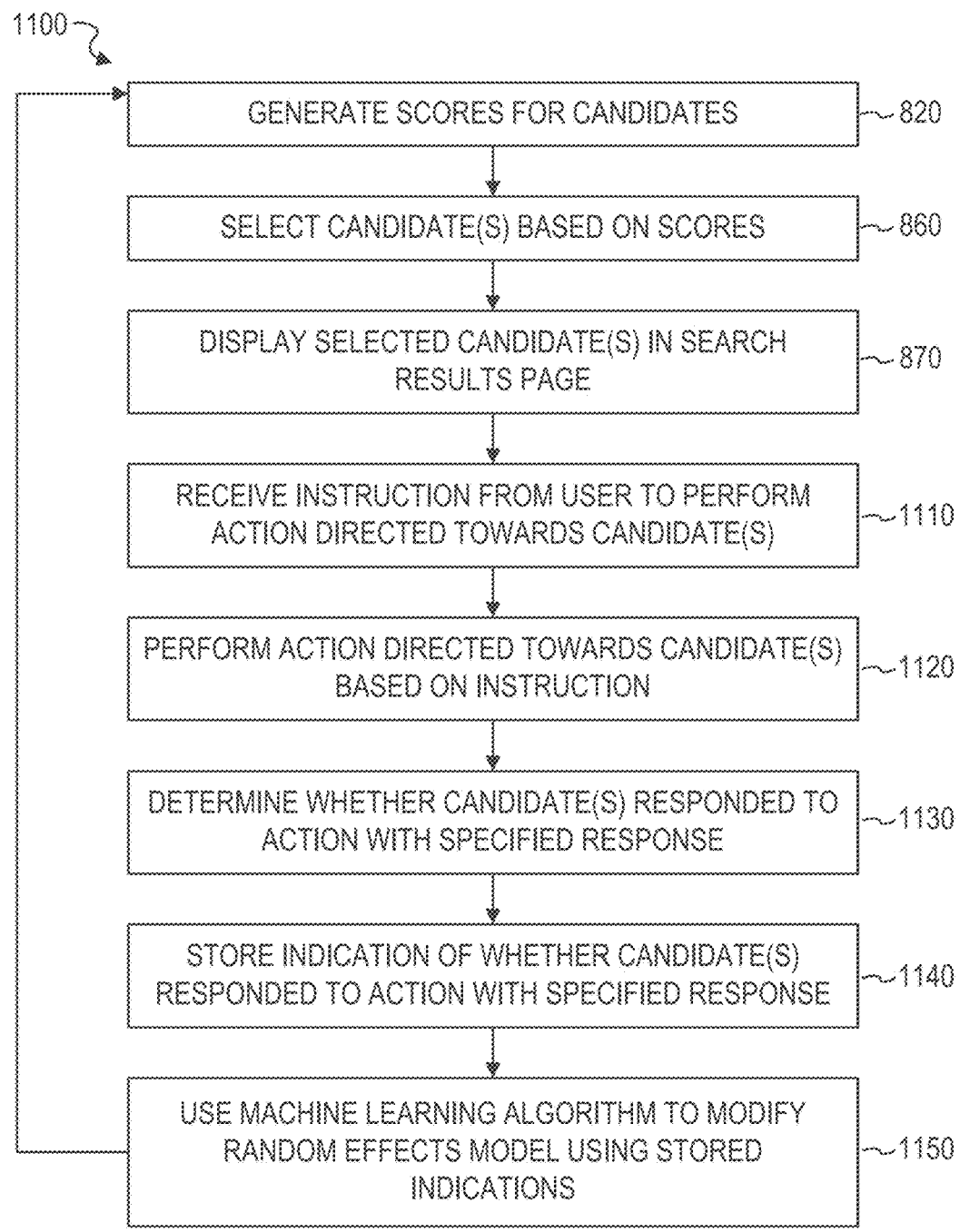
FIG. 11 is a flowchart illustrating yet another method of using a generalized linear mixed model for search, in accordance with an example embodiment.

Operations 1110, 1120, 1130, 1140, and 1150 of method 1100 in FIG. 11 may be performed subsequent to operations 820, 860, and 870 of either method 800 in FIG. 8 or method 900 in FIG. 9.

At operation 1110, the information retrieval system 216 receives an instruction from the computing device of the user to perform an action directed towards at least one of the subset of candidates.

At operation 1120, the information retrieval system 216 performs the action directed towards the at least one of the subset of candidates based on the instruction.

At operation 1130, the information retrieval system 216 determines whether the at least one of the subset of candidates to whom the action was directed responded to the action with at least one of the one or more specified responses.

At operation 1140, for each one of the at least one of the subset of candidates to whom the action was directed, the information retrieval system 216 stores an indication of whether the at least one of the subset of candidates responded to the action with at least one of the one or more specified responses in the database of the social networking service.

At operation 1150, the information retrieval system 216 uses a machine learning algorithm to modify the user-based model based on the stored indications of whether the at least one of the subset of candidates responded to the action with at least one of the one or more specified responses.

Method 1100 may then use the modified user-based model to generate scores for candidates at operation 820.

It is contemplated that any of the other features described within the present disclosure can be incorporated into method 900.

Figure 12:
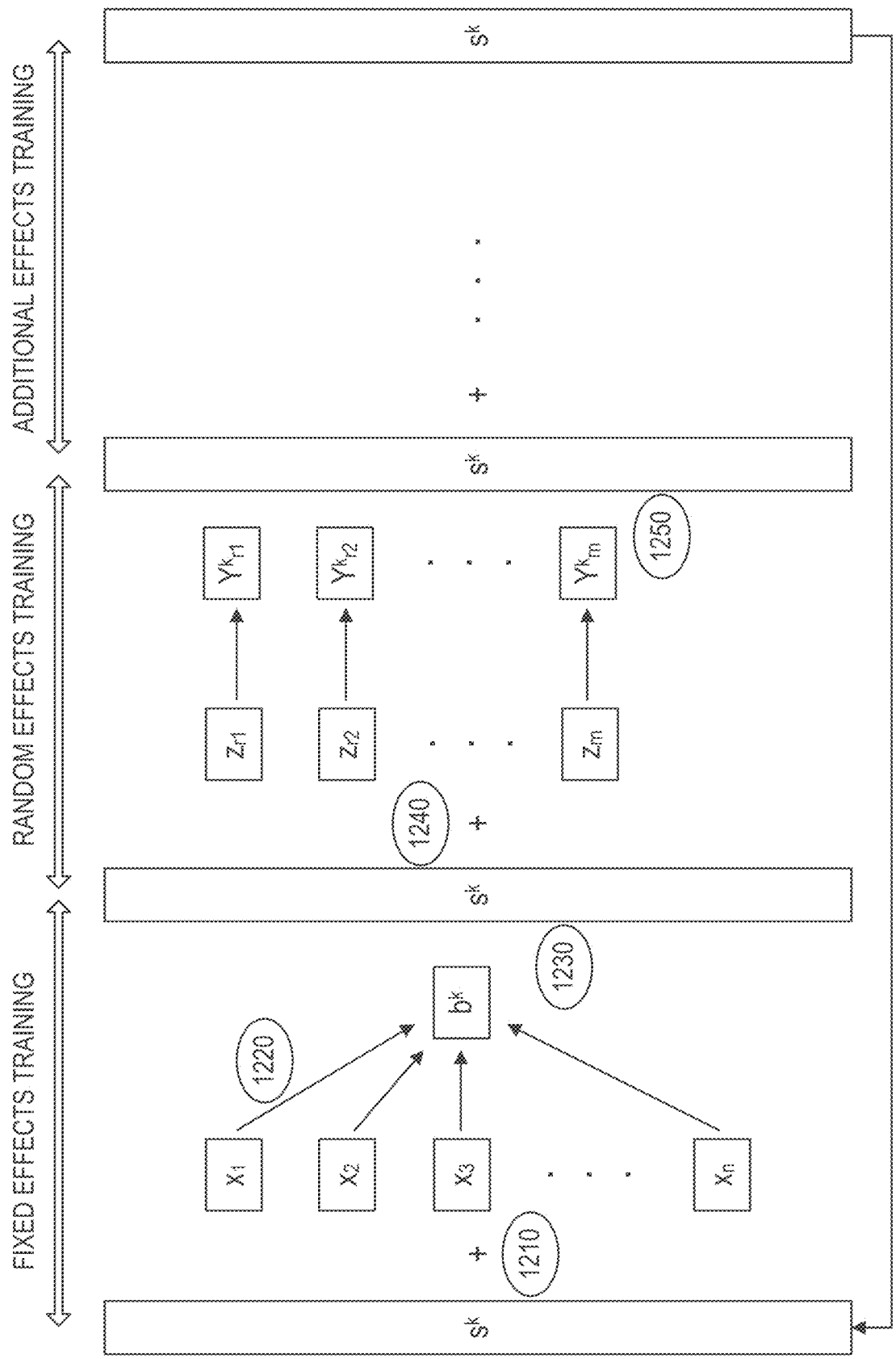
FIG. 12 illustrates a k-th iteration of the block coordinate descent algorithm for a generalized linear mixed model, in accordance with an example embodiment.

FIG. 12 illustrates a k-th iteration of the block coordinate descent algorithm for a generalized linear mixed model, in accordance with an example embodiment. In some example embodiments, the information retrieval system 216 uses a partitioning method, such as a parallel block-wise coordinate descent. This partitioning method comprises a fixed effects model training phase and multiple random effects model training phases.

In an example embodiment in which s represents scores generated using the generalized linear mixed model and b represents coefficients of the generalized linear mixed model, updating the fixed effects model may comprise: (1) preparing the training data with scores s; (2) updating coefficients b; and (3) updating scores s. Updating the random-effects models may comprise: (4) preparing the data with scores s, and (5) updating the random effect coefficients and scores. Given that each entity (e.g., member/job) may have a coefficient vector in the generalized linear mixed model, if there is a random effect model for each row and column, for example, if there are 10 million users, and 1000 features, there will 10 billion coefficients. The number of coefficients grows with more users and features.

As a solution, the information retrieval system 216 may shard the data by rows and samples, and minimize communication cost to avoid carrying random-effects model coefficients across computing nodes. The information retrieval system 216 may also apply model pruning using cutting algorithm as well.

In the fixed effects training phase shown in FIG. 12, the fixed effect coefficient b is updated at iteration k. At operation 1210, the information retrieval system 216 prepares the training data with both the feature set $x_n$ and the latest score $s^k$, and partitions them into M nodes.

At operation 1020, given the training data, numerous types of distributed algorithms can be applied to learn b. In some example embodiments, the information retrieval system 216 used an all-reduce type of implementation for generalized linear models. First, the gradient of b for each sample n is computed and aggregated from each node to the master node. The master node computes the total gradient and updates b using optimizers, such as the limited memory Broyden-Fletcher-Goldfarb-Shanno (L-BFGS) algorithm.

At operation 1030, the new coefficients $b^{new}$ are then broadcast back to each node together with $b^{old}$ to update the score s, in order to prepare for the next effect's update.

Since the main network communication in this example embodiment is the transmission of b from the master node to the worker nodes, the overall network communication cost for one iteration of updating the fixed effects model is O(M P), where M is the number of computing nodes in the cluster and P denotes the dimension of the fixed effect feature space. In some example embodiments, the convergence is improved by updating b multiple times before updating the random effects models, for each iteration. In summary, updating the fixed effects model in the fixed effects training stage of FIG. 12 may comprise: (1) preparing the training data with scores s; (2) updating the coefficients b; and (3) updating the scores s.

One challenge in designing a scalable algorithm for a generalized linear mixed model on data sets with a huge number of random effects is that the dimension of the random effect coefficient space can potentially be as large as $N_r * P_r$, where $N_r$ denotes the number of random effects of type r (e.g., number of users). If the information retrieval system 216 were to naively apply the same approach as the one used in updating the fixed effects model, the network communication cost for updating the random effects for r becomes $M*N_r*P_r$. Given some data of moderate size for example, if $N_r=106$, $P_r=105$ and a cluster with M=100, the network I/O cost amounts to $10^{13}$. One solution provided by the present disclosure to make the algorithm scalable is to avoid communicating or broadcasting the random effect coefficient across the computing nodes in the cluster. Before the random effects updating phase and as a pre-processing step, for each random effect r and ID 1, the information retrieval system 216 may group the feature vectors $z_{rn}$ to form a feature matrix $Z_{rl}$, which consists of all the $z_{rn}$ that satisfy i(r; n)=1. At iteration k and for random effect r, the information retrieval system 216 may shuffle the current values of $s=\{s_n^k\}n\in\Omega$ using the same strategy (i.e., for ID 1, the information retrieval system 216 groups $s_n^k$ to form a vector $S_l^k$, which consists of all the $s_n^k$ that satisfies i(r; n)=1, where i(r; n) denotes an indexing function that retrieves the index of random effect type r in the n-th training sample. At operation 1240, with the right partitioning strategies, $S_l^k$ can be made to collocate with the corresponding feature matrix $Z_{rl}$, to prepare the training data for updating the random effects r.

At operation 1050, with the training data ready for each ID 1, any optimizer (e.g., L-BFGS) can be applied again to solve the optimization problem locally, such that the random effects rl can be learned in parallel without any additional network communication cost. Since both the coefficients and data collocate in the same node, the scores can be updated locally within the same step at operation 1050.

In summary, updating the random effects models in the random effects training stage and additional effects training stage of FIG. 12 may comprise: (1) preparing the training data with scores; and (2) updating the random effects coefficients and the scores.

Example Mobile Device

Figure 13:
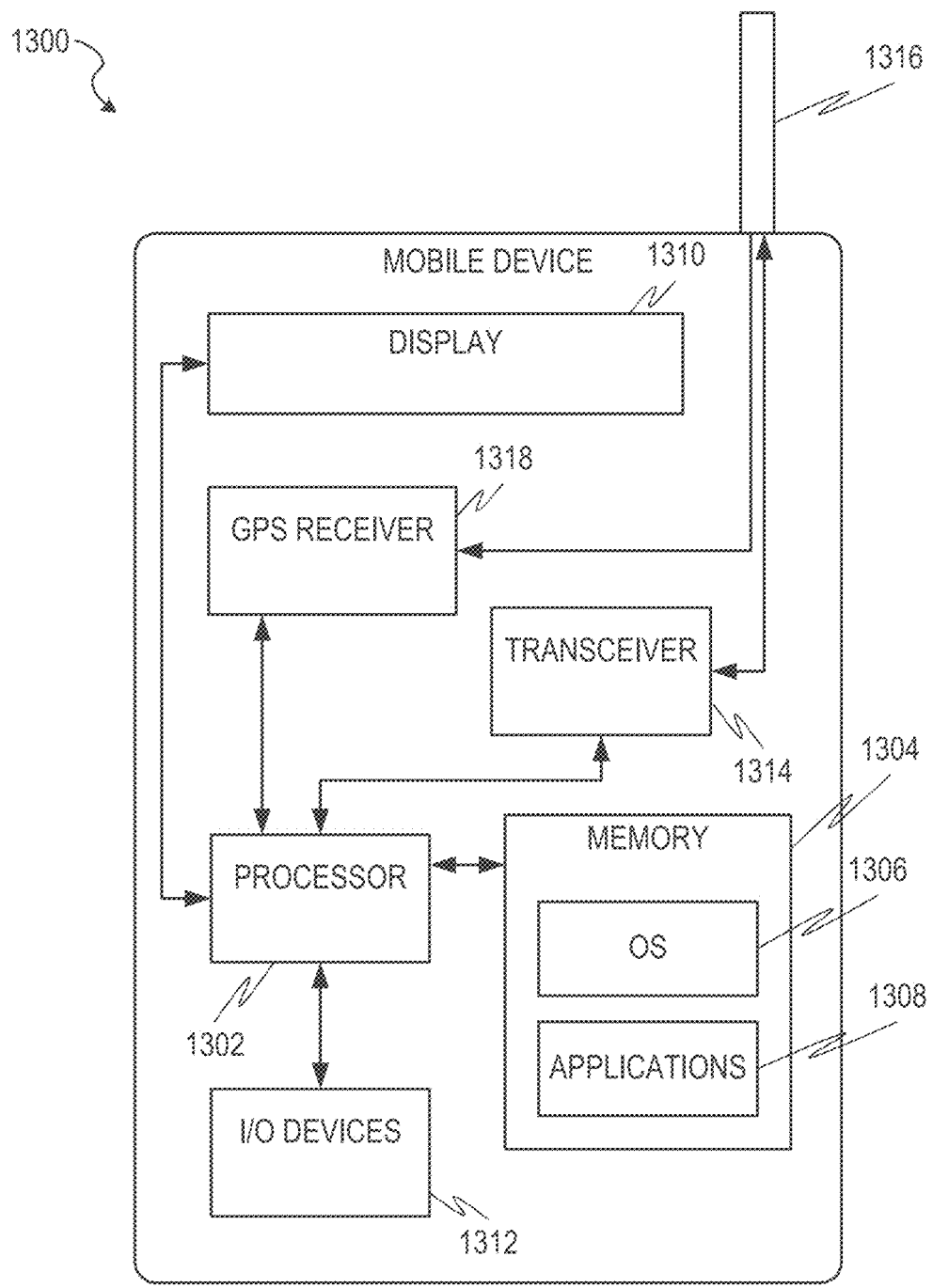
FIG. 13 is a block diagram illustrating a mobile device, in accordance with some example embodiments.

FIG. 13 is a block diagram illustrating a mobile device 1300, according to an example embodiment. The mobile device 1300 can include a processor 1302. The processor 1302 can be any of a variety of different types of commercially available processors suitable for mobile devices 1300 (for example, an XScale architecture microprocessor, a Microprocessor without Interlocked Pipeline Stages (MIPS) architecture processor, or another type of processor) A memory 1304, such as a random access memory (RAM), a Flash memory, or other type of memory, is typically accessible to the processor 1302. The memory 1304 can be adapted to store an operating system (OS) 1306, as well as application programs 1308, such as a mobile location-enabled application that can provide location-based services (LBSs) to a user. The processor 1302 can be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 can be coupled to a transceiver 1314 that interfaces with an antenna 1316. The transceiver 1314 can be configured to both transmit and receive cellular network signals, wireless data signals, or other types of signals via the antenna 1316, depending on the nature of the mobile device 1300. Further, in some configurations, a GPS receiver 1318 can also make use of the antenna 1316 to receive GPS signals Modules, Components and Logic Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product. e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
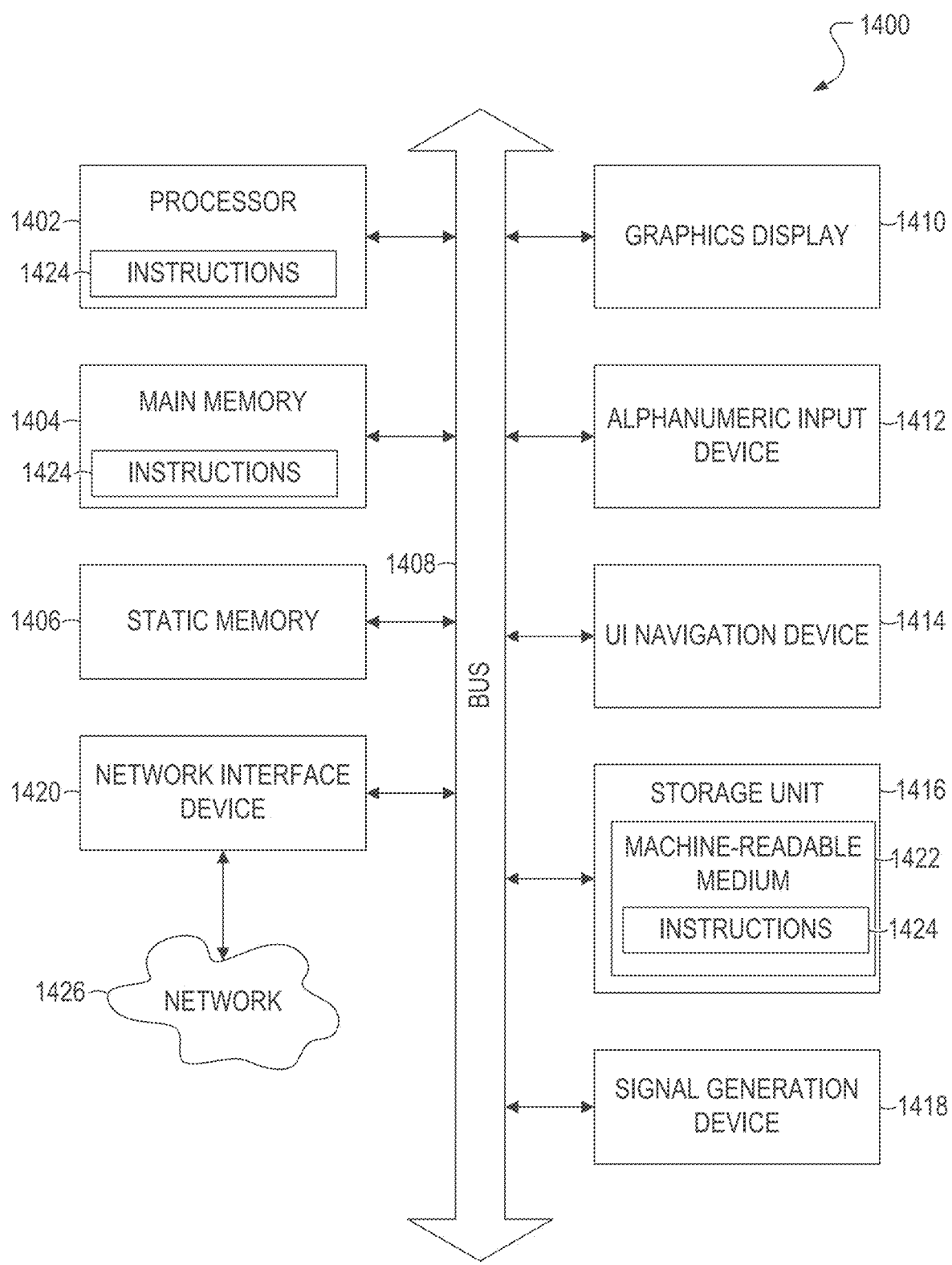
FIG. 14 is a block diagram of an example computer system on which methodologies described herein may be executed, in accordance with an example embodiment.

FIG. 14 is a block diagram of an example computer system 1400 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a graphics display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation device 1414 (e.g., a mouse), a storage unit 1416, a signal generation device 1418 (e.g., a speaker) and a network interface device 1420.

Machine-Readable Medium

The storage unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding or carrying instructions (e.g., instructions 1424) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    receiving, by a computer system having at least one hardware processor, a search query from a computing device of a user, the search query comprising at least one search term and being received in association with a user identification identifying the user;
    for each one of a plurality of candidates, extracting, by the computer system, features from a corresponding profile of the candidate stored in a database of a social networking service;
    for each one of the plurality of candidates, generating, by the computer system, a corresponding score based on a generalized linear mixed model comprising a query-based model and a user-based model, the query-based model being a generalized linear model based on a search for the at least one search term in the profile of the one of the plurality of candidates, and the user-based model being a random effects model based on a history of user actions by the user directed towards candidates having profiles with features matching the features of the corresponding profile of the one of the plurality of candidates and indications of whether the candidates to whom the user actions were directed responded to the user actions with at least one of one or more specified responses;
    selecting, by the computer system, a subset of candidates from the plurality of candidates based on the corresponding scores of the subset of candidates; and
    causing, by the computer system, the selected subset of candidates to be displayed on the computing device of the user in a search results page for the search query.

2. The computer-implemented method of claim 1, wherein the search query is received in association with a task identification identifying an agreement by the user to perform a specific task for an entity, and the generalized linear mixed model further comprises a task-based model, the task-based model being a random effects model based on a history of user actions associated with the task identification directed towards candidates having profiles with features matching the features of the corresponding profile of the one of the plurality of candidates and indications of whether the candidates to whom the user actions were directed responded to the user actions with at least one of one or more specified responses.

3. The computer-implemented method of claim 1, wherein the query-based model is a fixed effects model.

4. The computer-implemented method of claim 1, wherein the query-based model is based on at least one of term frequency and term frequency-inverse document frequency.

5. The computer-implemented method of claim 1, wherein the features comprise at least one of educational background, employment history, industry, interests, and skills.

6. The computer-implemented method of claim 1, wherein the user actions comprise sending messages to the candidates, and the one or more specified responses comprise at least one of reading the message and sending a reply message to the user.

7. The computer-implemented method of claim 1, wherein:
    the generating the corresponding score for each one of the plurality of candidates is performed prior to the receiving of the search query from the computing device of the user;
    the computer-implemented method further comprises storing, by the computer system, the generated scores in the database of the social networking service prior to the receiving of the search query from the computing device of the user; and
    the selecting of the subset of candidates comprises retrieving the generated scores from the database in response to the receiving of the search query, and selecting the subset of candidates based on the retrieved scores.

8. The computer-implemented method of claim 1, wherein the generating the corresponding score for each one of the plurality of candidates is performed in response to the receiving of the search query from the computing device of the user.

9. The computer-implemented method of claim 1, wherein the selecting the subset of candidates comprises:
    ranking the plurality of candidates based on their corresponding scores; and
    selecting the subset of candidates based on the ranking of the plurality of candidates.

10. The computer-implemented method of claim 1, further comprising:
    receiving, by the computer system, an instruction from the computing device of the user to perform an action directed towards at least one of the subset of candidates;
    performing, by the computer system, the action directed towards the at least one of the subset of candidates based on the instruction;
    determining, by the computer system, whether the at least one of the subset of candidates to whom the action was directed responded to the action with at least one of the one or more specified responses;
    for each one of the at least one of the subset of candidates to whom the action was directed, storing, by the computer system, an indication of whether the at least one of the subset of candidates responded to the action with at least one of the one or more specified responses in the database of the social networking service; and using, by the computer system, a machine learning algorithm to modify the user-based model based on the stored indications of whether the at least one of the subset of candidates responded to the action with at least one of the one or more specified responses.

11. A system comprising:
at least one hardware processor; and
a non-transitory machine-readable medium embodying a set of instructions that, when executed by the at least one hardware processor, cause the at least one processor to perform operations, the operations comprising:
receiving a search query from a computing device of a user, the search query comprising at least one search term and being received in association with a user identification identifying the user;
for each one of a plurality of candidates, extracting features from a corresponding profile of the candidate stored in a database of a social networking service;
for each one of the plurality of candidates, generating a corresponding score based on a generalized linear mixed model comprising a query-based model and a user-based model, the query-based model being a generalized linear model based on a search for the at least one search term in the profile of the one of the plurality of candidates, and the user-based model being a random effects model based on a history of user actions by the user directed towards candidates having profiles with features matching the features of the corresponding profile of the one of the plurality of candidates and indications of whether the candidates to whom the user actions were directed responded to the user actions with at least one of one or more specified responses;
selecting a subset of candidates from the plurality of candidates based on the corresponding scores of the subset of candidates; and
causing the selected subset of candidates to be displayed on the computing device of the user in a search results page for the search query.

12. The system of claim 11, wherein the search query is received in association with a task identification identifying an agreement by the user to perform a specific task for an entity, and the generalized linear mixed model further comprises a task-based model, the task-based model being a random effects model based on a history of user actions associated with the task identification directed towards candidates having profiles with features matching the features of the corresponding profile of the one of the plurality of candidates and indications of whether the candidates to whom the user actions were directed responded to the user actions with at least one of one or more specified responses.

13. The system of claim 11, wherein the query-based model is a fixed effects model based on at least one of term frequency and term frequency-inverse document frequency.

14. The system of claim 11, wherein the features comprise at least one of educational background, employment history, industry, interests, and skills.

15. The system of claim 11, wherein the user actions comprise sending messages to the candidates, and the one or more specified responses comprise at least one of reading the message and sending a reply message to the user.

16. The system of claim 11, wherein:
the generating the corresponding score for each one of the plurality of candidates is performed prior to the receiving of the search query from the computing device of the user;
the operations further comprise storing the generated scores in the database of the social networking service prior to the receiving of the search query from the computing device of the user; and
the selecting of the subset of candidates comprises retrieving the generated scores from the database in response to the receiving of the search query, and selecting the subset of candidates based on the retrieved scores.

17. The system of claim 11, wherein the generating the corresponding score for each one of the plurality of candidates is performed in response to the receiving of the search query from the computing device of the user.

18. The system of claim 11, wherein the selecting the subset of candidates comprises:
ranking the plurality of candidates based on their corresponding scores; and
selecting the subset of candidates based on the ranking of the plurality of candidates.

19. The system of claim 11, wherein the operations further comprise:
receiving an instruction from the computing device of the user to perform an action directed towards at least one of the subset of candidates;
performing the action directed towards the at least one of the subset of candidates based on the instruction;
determining whether the at least one of the subset of candidates to whom the action was directed responded to the action with at least one of the one or more specified responses;
for each one of the at least one of the subset of candidates to whom the action was directed, storing an indication of whether the at least one of the subset of candidates responded to the action with at least one of the one or more specified responses in the database of the social networking service; and
using a machine learning algorithm to modify the user-based model based on the stored indications of whether the at least one of the subset of candidates responded to the action with at least one of the one or more specified responses.

20. A non-transitory machine-readable medium embodying a set of instructions that, when executed by at least one hardware processor, cause the processor to perform operations, the operations comprising:
receiving a search query from a computing device of a user, the search query comprising at least one search term and being received in association with a user identification identifying the user;
for each one of a plurality of candidates, extracting features from a corresponding profile of the candidate stored in a database of a social networking service;
for each one of the plurality of candidates, generating a corresponding score based on a generalized linear mixed model comprising a query-based model and a user-based model, the query-based model being a generalized linear model based on a search for the at least one search term in the profile of the one of the plurality of candidates, and the user-based model being a random effects model based on a history of user actions by the user directed towards candidates having profiles with features matching the features of the corresponding profile of the one of the plurality of candidates and indications of whether the candidates to whom the user actions were directed responded to the user actions with at least one of one or more specified responses;

selecting a subset of candidates from the plurality of candidates based on the corresponding scores of the subset of candidates; and causing the selected subset of candidates to be displayed on the computing device of the user in a search results page for the search query.

\* \* \* \* \*